(12) United States Patent
Chou (10) Patent No.: US 6,392,884 B1
(45) Date of Patent: May 21, 2002

(54) HOUSING ASSEMBLY FOR EXTRACTABLE REDUNDANT ARRAY OF INDEPENDENT DISKS

(75) Inventor: Chin-Wen Chou, Hsin-Tien (TW)

(73) Assignee: Shin Jiuh Corp., Taipei Hsien (TW)

( * ) Notice: Subject to any disclaimer, the term of this patent is extended or adjusted under 35 U.S.C. 154(b) by 9 days.

(21) Appl. No.: 09/629,865

(22) Filed: Aug. 1, 2000

(51) Int. Cl.7 .................................................. G06F 1/16
(52) U.S. Cl. ........................ 361/687; 361/704; 361/707; 360/97.01; 360/98.01
(58) Field of Search ............................... 361/687, 699, 361/680, 681, 700, 704, 707, 685, 686; 364/708.1; 165/104.33, 104.22; 360/97.01, 98.01, 97.03, 98.03

(56) References Cited

U.S. PATENT DOCUMENTS 5,119,270 A * 6/1992 Bolton et al. ................ 361/683
5,526,226 A * 6/1996 Katoh et al. ................. 361/680
6,084,742 A * 7/2000 Takaishi et al. ......... 360/708.06
6,222,727 B1 * 4/2001 Wu ............................. 361/685

* cited by examiner

*Primary Examiner*—Darren Schuberg
*Assistant Examiner*—Hung Van Duong
(74) *Attorney, Agent, or Firm*—Bacon & Thomas (57) ABSTRACT

A housing assembly for an extractable redundant array of independent disks includes a main frame placed in a casing through an open end of the casing; a plurality of extractable frames aligned in two spaced-apart rows in the main frame; and a signal-processing unit disposed in a corridor between the extractable frames for accommodating a plurality of extractable units. The extractable units are respectively inserted in the extractable frames and connected with the signal-processing unit to provide an expanded-capacity housing assembly for the extractable redundant array of independent disks in which each extractable unit (hard disk drive) and the main frame can be extracted individually and independently.

10 Claims, 7 Drawing Sheets

HOUSING ASSEMBLY FOR EXTRACTABLE REDUNDANT ARRAY OF INDEPENDENT DISKS

BACKGROUND OF THE INVENTION

This invention relates generally to a disk-drive array, and more particularly, to a housing assembly having an extractable redundant array of independent disks for promoting beautification and for expanding the capacity of a computer casing, wherein a plurality of extractable units and a main frame can be extracted respectively and independently.

It does not seem unusual for an Internet service provider (ISP) to, figuratively, wake up in the morning and find out that it must build storing facilities having a far larger capacity than was required yesterday, just to meet the need for increased speed that developed overnight.

To do so, the ISP currently has to enlarge the existing worksite or to shrink the volume of the server computer to use the space available more efficiently. The time needed for the former is commonly known greatly longer than for the latter.

Regarding the server computer implemented in the machine room, the trend is that a 2U (1.75×2 inches high) or even 1U (1.75 inches) computer is or will be substituted for the prior 5U (1.75×5 inches high) or 4U (1.75×4 inches high) computer for saving space.

On the other hand, when the volume of the computer is reduced, the disposition of inside components and disk drives has to be readjusted on a large scale. Taking the disk drives for instance, in the 1U computer, it is difficult to arrange a redundant array of independent disks uprightly in a computer casing, (unlike the 5U, 4U, or 2U computer), and hence, only 2 or 3 hard disk drives can be placed horizontally in the 1U computer casing.

Furthermore, if a plurality of hard disk drives is intermittently and fixedly disposed in a computer casing, the casing has to be dismounted in case replacement of the hard disk drives is desired. Moreover, if the hard disk drives are partitioned with separate cover boards, it would surely make trouble for an Internet Service Provider, particularly if pieces of the separate cover board got lost, in which case an open hole would become accessible for foreign goods to enter the casing that may result in a short circuit or damage of inside components.

In view of the abovesaid defects or inconvenience, this invention provides a housing assembly for a redundant array of independent disks that can promote beautification of a computer and raise the storage capacity thereof, and in particular a housing for accommodating a redundant array of independent disks according to the 1U computer specifications in which the array can be extracted at will.

SUMMARY OF THE INVENTION

The primary object of this invention is to provide a housing assembly for an extractable redundant array of independent disks in a 1U computer, comprising: a main frame placed in a casing through an open end; a plurality of extractable frames aligned in two spaced-apart rows in the main frame; and a signal-processing unit disposed in a corridor between the extractable frames for accommodating a plurality of extractable units. The disk drives are inserted individually in the extractable frames and respectively connected with the signal-processing unit to provide an expanded-capacity housing assembly for a redundant array of independent disks in which each extractable unit (hard disk drive) and the main frame can be extracted individually and independently.

Another object of this invention is to provide an extractable unit which enables modular design of a hard disk drive, power supply, and controller for a redundant array of independent disks, etc.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of the invention, which is to be made later, are described briefly as follows.

DETAILED DESCRIPTION OF THE PREFERRED EMBODIMENT

Figure 1:
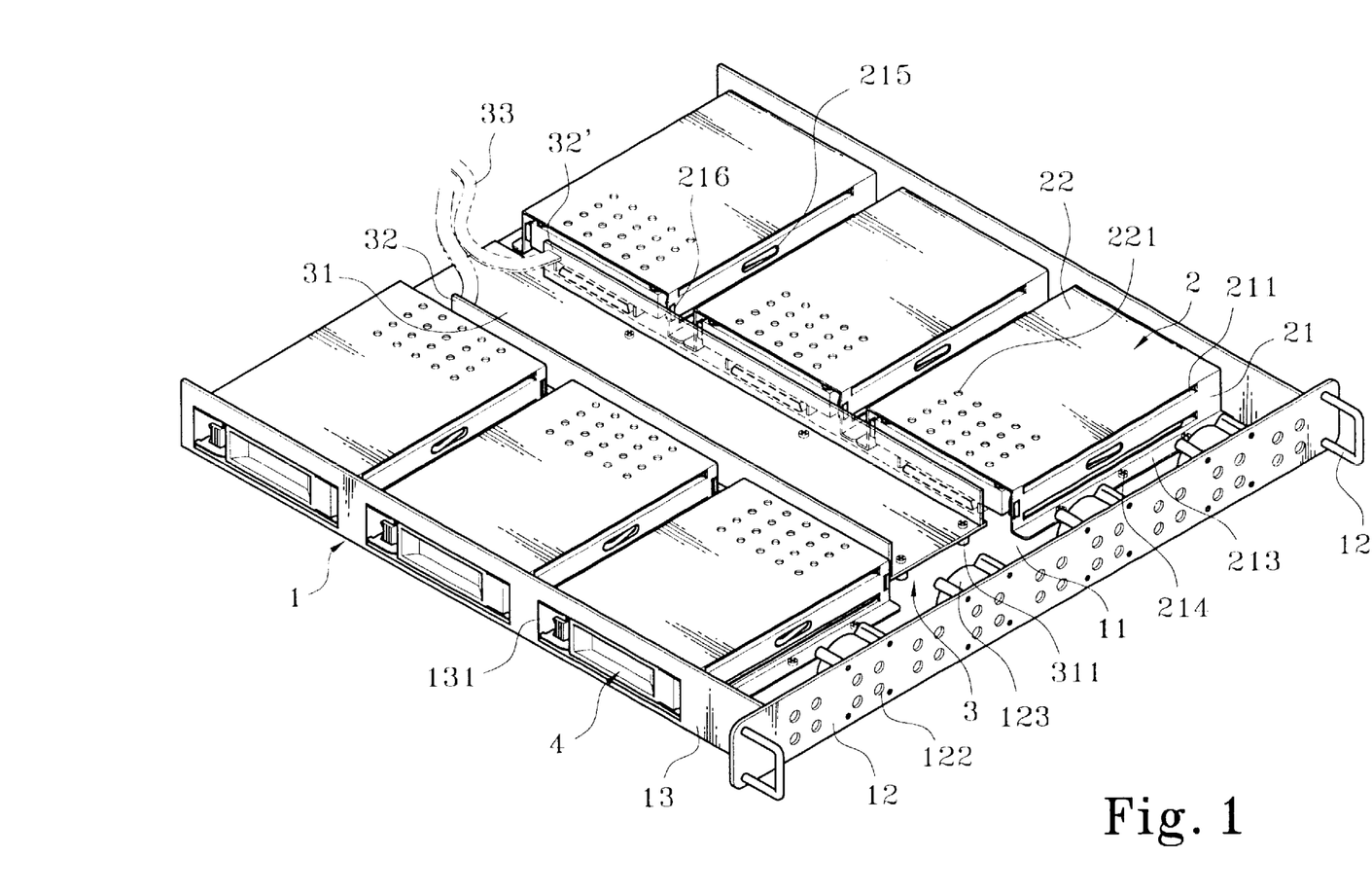
FIG. 1 is an isometric view of a preferred embodiment.
Figure 2:
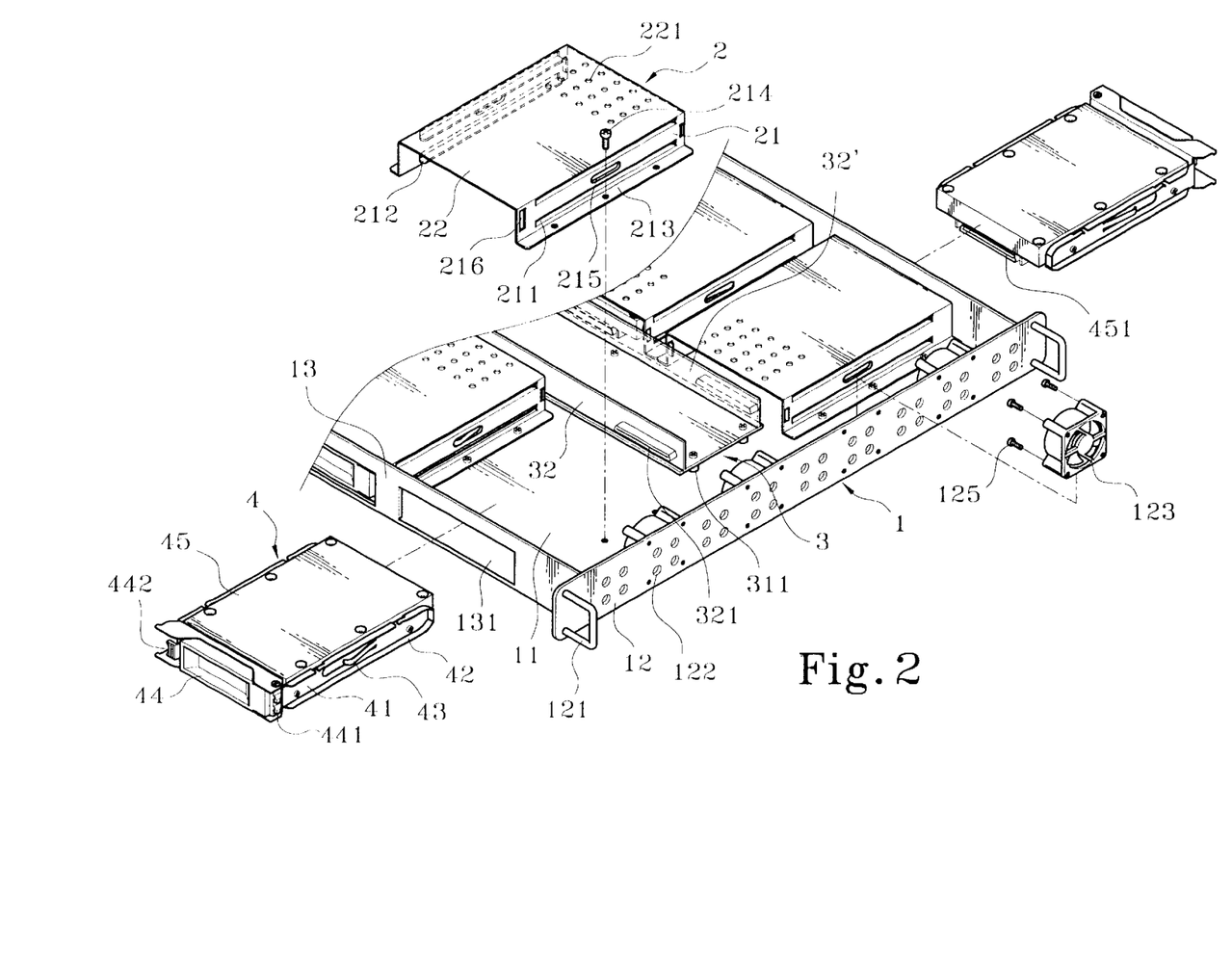
FIG. 2 is a partially exploded view of the preferred embodiment.
Figure 3:
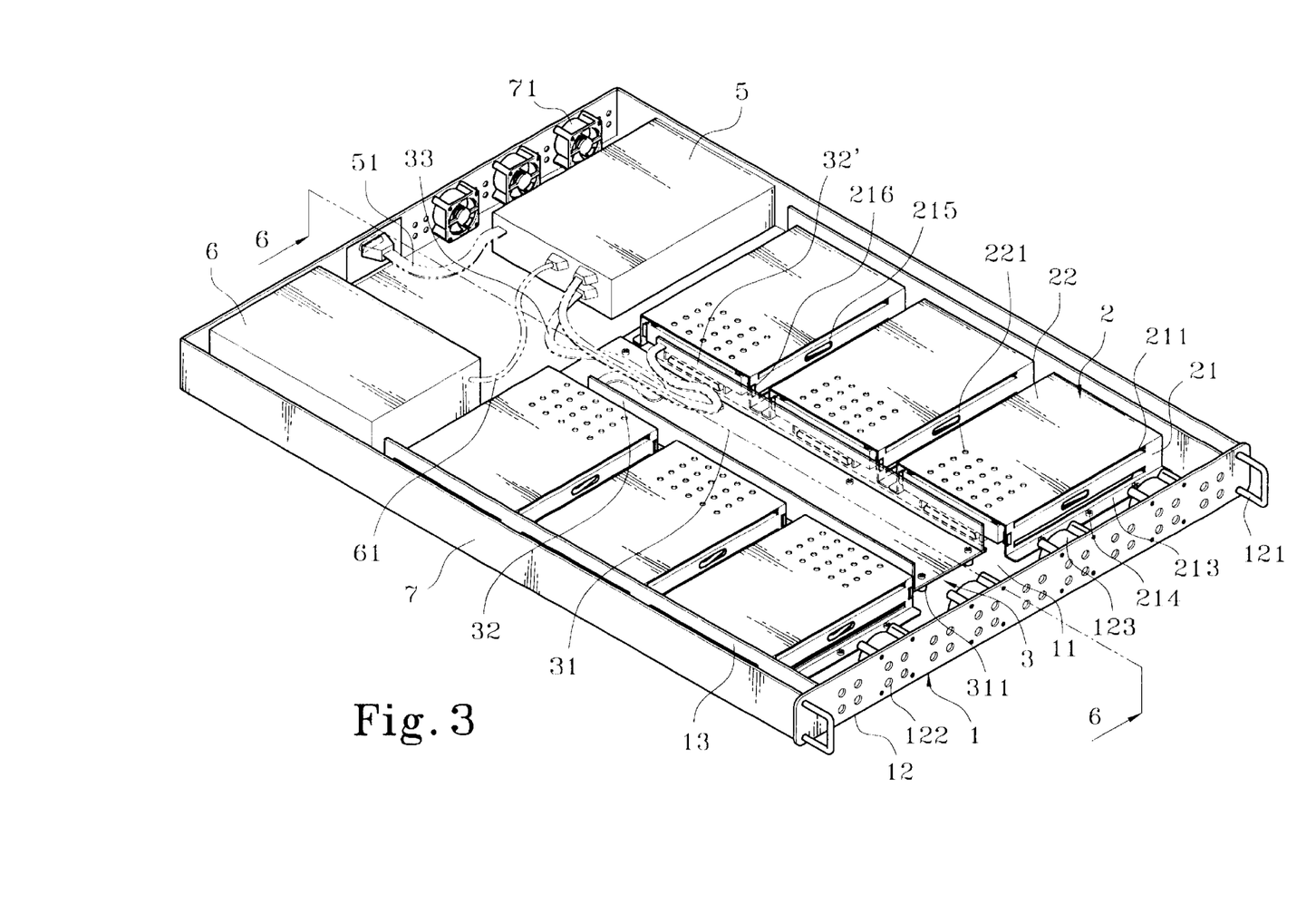
FIG. 3 is a further isometric view of the preferred embodiment of the preferred embodiment.

As shown in FIGS. 1, 2 and 3, a housing assembly for an extractable redundant array of independent disks according to the invention is arranged to fit within the universal 1U (1.75 inches high) dimensions allotted for a housing of an entrance reserved (not shown), or an open end formed, at a front end of the computer casing 7 of an industrial or server computer. The housing assembly for the extractable redundant array of independent disks comprises a main frame 1 arranged to be inserted into the open end of the casing 7, a plurality of extractable frames 2 aligned in two spaced-apart rows in the main frame 1, a signal-processing unit 3 disposed on the main frame 1 at a position facing the opposed rear ends of the extractable frames 2, and a plurality of extractable units 4. The extractable units 4 form modules, each of which includes a hard disk drive 45. Also included in the casing 7 are a power supply 6, and a redundant array of independent disks controller 5 coupled to the power supply 6. The hard disk drives 45 are inserted in the extractable frames 2 and coupled with the signal processing unit 3 respectively, which in turn is coupled to the controller 5.

The main frame 1 housed in the casing 7 via the open end comprises a sustaining board 11 and a panel 12 provided with a force-applying portion 121 that permits extraction of the main frame 1. Each of two lateral ends of the sustaining board 11 is bent into a wall plate 13 with a plurality of through holes 131 for aiding positioning of the extractable units 4. A plurality of cooling fans 123 is anchored at the panel 12 by set bolts 125 and a plurality of heat-dissipating holes 122 is perforated in the panel 12 at positions corresponding to the cooling fans 123. The force-applying portion 121 includes a pair of handgrips separately fixed at two lateral ends of the panel 12 individually.

The extractable frames 2 are located at two lateral portions of the sustaining board 11 and bent to form a covering board 22 having a plurality of punched holes 221 and two lateral plates 21 individually provided with a guiding track 212. The bottom edge of each lateral plate 21 is further bent to form a coupling portion 213, which is joined to the sustaining board 11 by a plurality of fixing elements 214. The plurality of punched holes 221 formed in the covering board 22 or the lateral plates 21 serve as heat-dissipating holes 221.

The signal-processing unit 3 is disposed on the sustaining board 11 in a corridor between the two rows of extractable frames 2, and includes a stationary deck 31 housed on the sustaining board 11 by a plurality of segregating feet 311 and a plurality of first circuit boards 32, 32' disposed on two sides of the stationary deck 31. The stationary deck 31 is provided with a plurality of slots 321 arranged at positions corresponding to that of each extractable unit 4 respectively to permit the hard disk drives 45 to be coupled with the signal-processing unit 3. The signal processing unit 3 interacts with the redundant array of independent disks controller 5.

Figure 4:
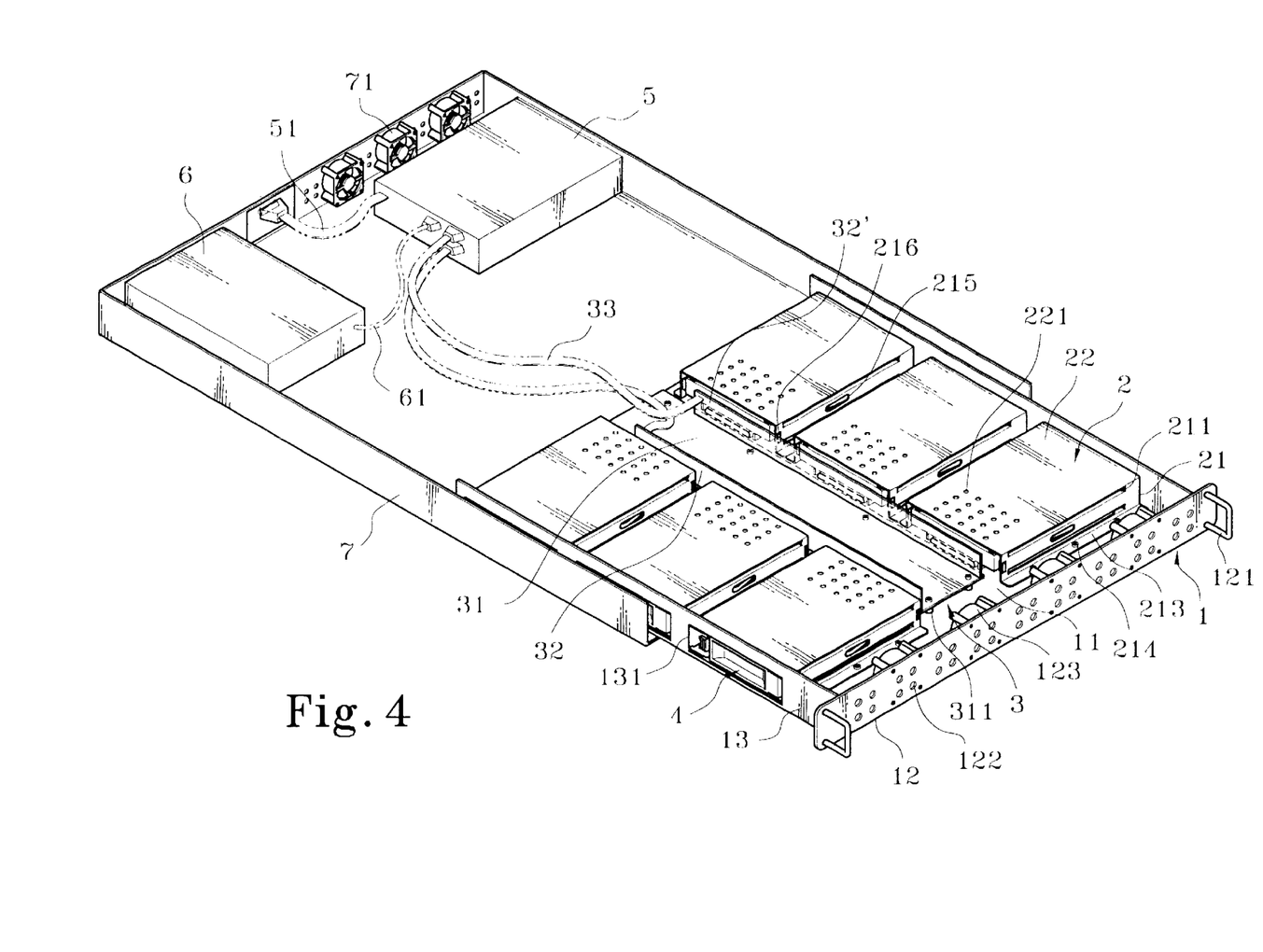
FIG. 4 is an isometric view showing an extracted main frame of the preferred embodiment.
Figure 5:
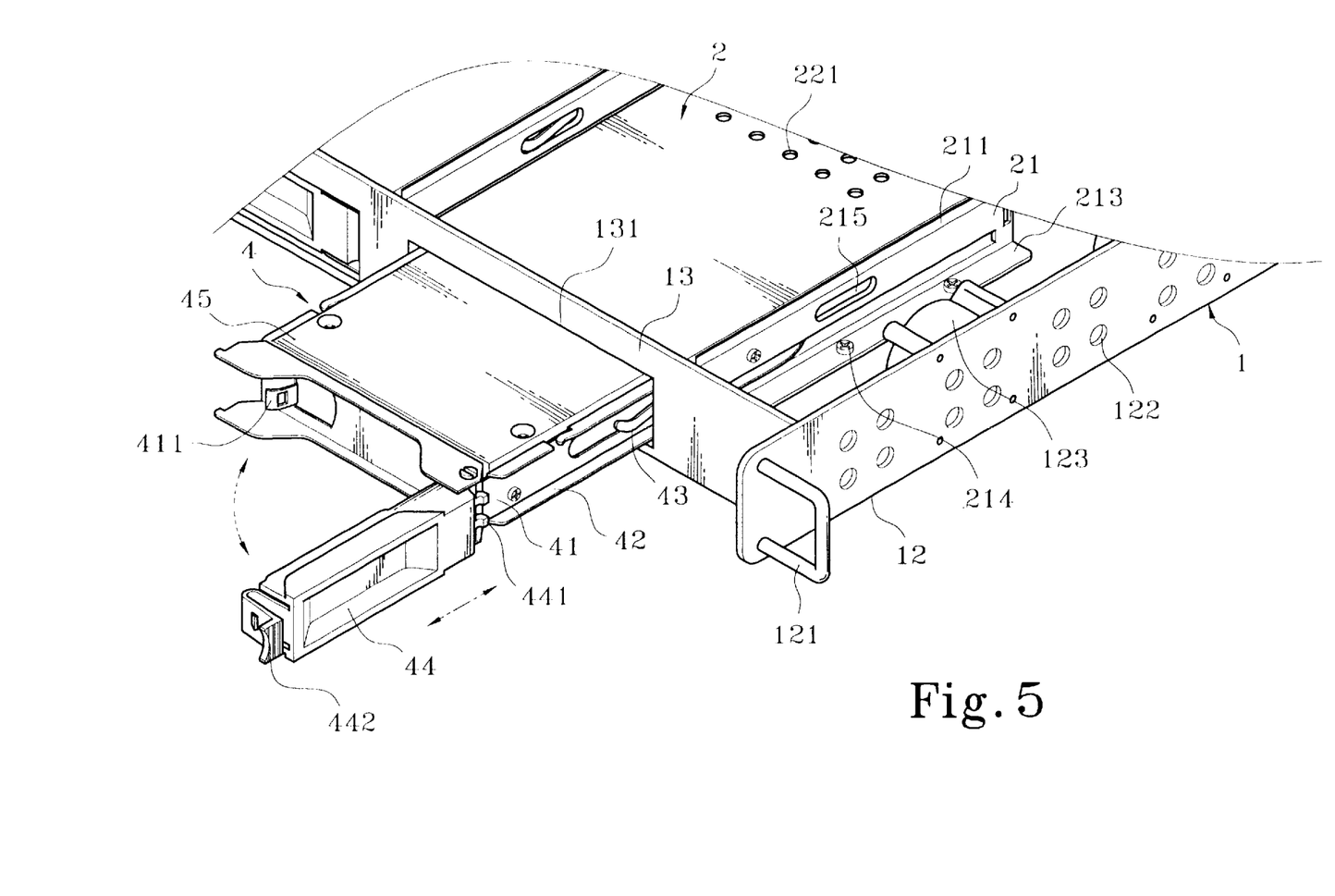
FIG. 5 is an isometric view showing an extracted extractable unit of the preferred embodiment.

Referring to FIGS. 4 and 5, after the abovesaid components have been assembled, a user is supposed to push each extractable unit 4 into one of the extractable frames 2 along the guiding tracks 212 until two arcuate resilient hook ears 43 engage with hooking holes 215 in the lateral plates 21 of each extractable frame 2 by taking advantage of a pair of lateral guiding pieces 42 formed on each of two lateral faces of an extraction frame 41 of a respective hard disk drive 45. Then, the user is to: plug a signal-processing terminal 451 of the hard disk drive 45 in the slot 321 of the first circuit board 32, 32'; push a panel 44 pivotally joined to a front end of the extraction frame 41 toward the latter to enable a snap ear 441 of the panel 44 to buckle with a snap hole 216 formed in one of the lateral plates 21; and close the panel 44 to have a flexible joining portion 442 thereof snap-retained at a punch-formed fixing ear 411 located at the other front end of the extraction frame 41 to hereby fix each extractable unit 4 in each corresponding extractable frame 2. (The fact that an extractable mechanism of a generic hard disk drive with equivalent function may be substituted for the abovesaid paired mechanism of the extractable frame 2 and the extraction frame 41 will not be iterated hereinafter.)

Now, the user may apply force onto the force-applying portion 121 and push the main frame 1 into the casing 7 through the open end, then connect the two first circuit boards 32, 32' to the redundant array of independent disks controller 5 respectively with a ribbon cable 33; connect a power supply 6 to the redundant array of independent disks controller 5 with a power-supply cord 61; and couple the redundant array of independent disks controller 5 to the closed end of the casing 7 with another ribbon cable 51 to complete assembly of the redundant array of independent disks. (The known controlling and processing mode will not be iterated here again).

Figure 6:
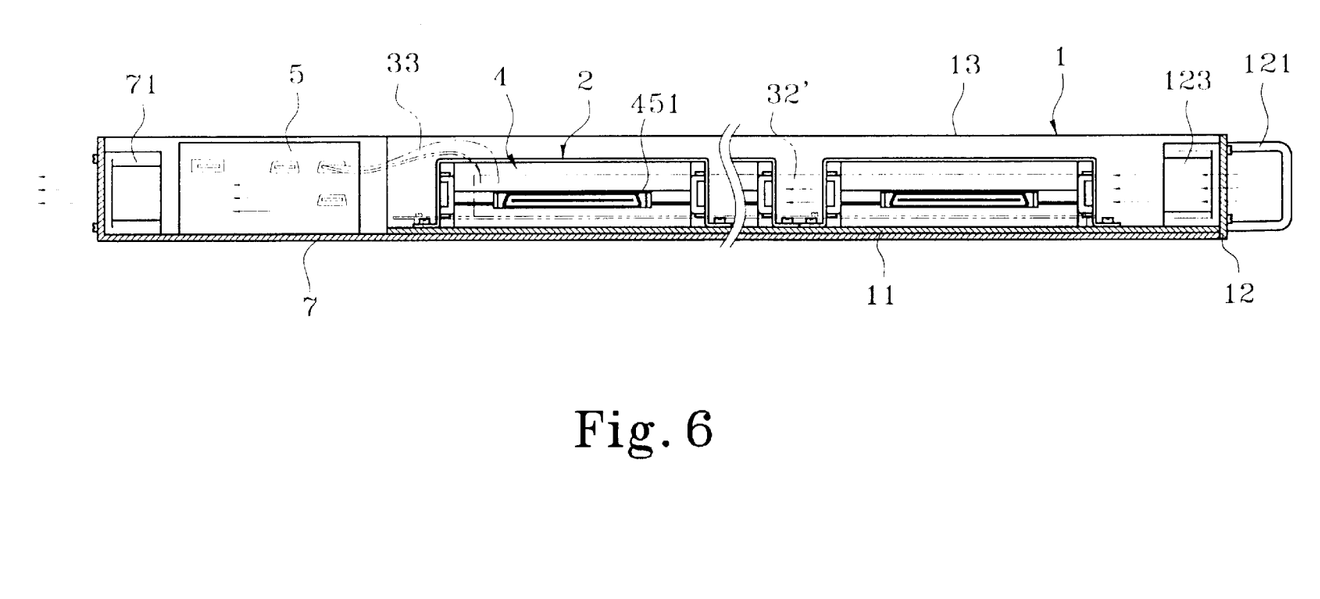
FIG. 6 is a cutaway sectional view taken along line 6—6 in FIG. 3 showing an airflow moving direction.

According to the airflow moving direction shown in FIG. 6, in order to enable normal operation of a hard disk drive 45 in the extractable unit 4 and the first circuit board 32, 32', a plurality of cooling fans 123 are arranged in the panel 12 of the main frame 1 to suck in outside air through the heat dissipating holes 122 and blow the air toward the first circuit boards 32, 32' and then through the punched heat-dissipating holes 221 to cool down the hard disk drive 45 in the extractable unit 4. The exhausted hot air is sucked by a fan set 71 disposed at the rear end of the casing 7 and rejected to the outside to thereby obtain effective heat dissipation for each hard disk drive 45 in the extractable units 4 and for the first circuit boards 32, 32'.

Replacement of a hard disk drive 45 can be done by reversing the assembling order (shown in FIGS. 4 and 5). A sufficient length of the ribbon cable 33 must have been reserved beforehand to permit extraction of the main frame 1 so that it won't be difficult to dismount and mount again the casing 7 and the ribbon cable 33 during replacement. Unlike the case of a generic 1U or 2U computer, there is no separate cover to lose, and no chance that foreign articles will invade to incur a short circuit or damage of inside components when the hard drive 45 is not in use. Besides, the main frame 1 may be lengthened or shortened depending on the number of hard disk drives 45 that are required, enabling flexible design of the space in the casing 7.

Figure 7:
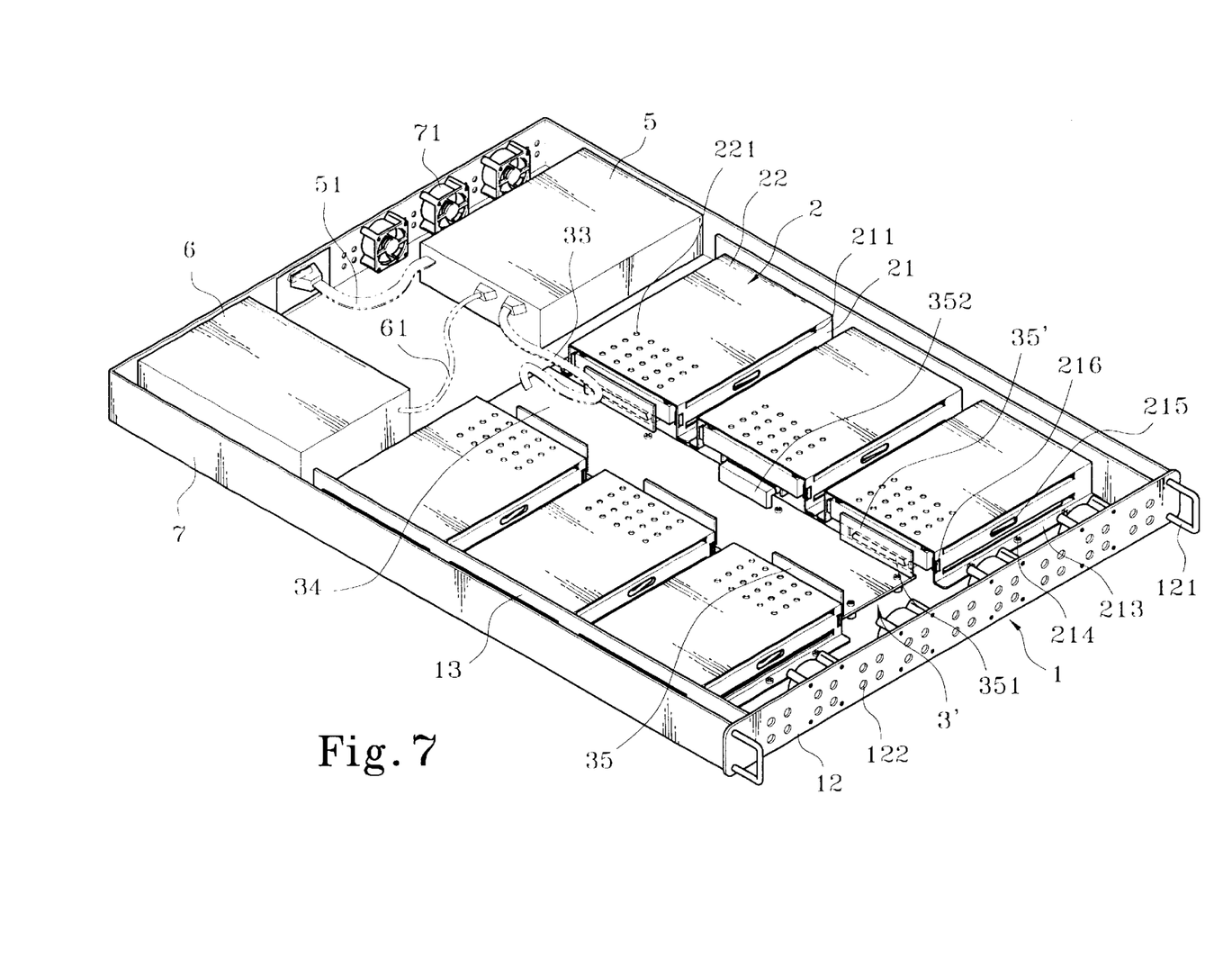
FIG. 7 is an isometric view of another embodiment of this invention.

In another embodiment of this invention shown in FIG. 7, a signal-processing unit 3' comprises a main circuit board 34 fixedly disposed on the sustaining board 11 by taking advantage of the segregating feet 311 and a plurality of sub-circuit boards 35, 35' residing laterally on the main circuit board 34 and provided with a slot 351 individually positioned correspondingly to each extractable unit 4, the sub-circuit board 35, 35' being bent at a turning point to form a relay slot 352 lying on the main circuit board 34, and connected with the redundant array of independent disks controller 5 via the ribbon cable 33.

Although, this invention has been described in terms of preferred embodiments, it is apparent that numerous variations and modifications may be made without departing from the true spirit and scope thereof, as set forth in the following claims.

What is claimed is:

1. A housing assembly for an extractable redundant array of independent disks, comprising:
   a main frame disposed in a casing though an open end of the casing, said main frame further comprising a sustaining board and a panel provided with a force-applying portion arranged to enable extraction of the main frame from the casing;
   a plurality of spaced extractable frames located on two lateral portions of the sustaining board in a corridor between two rows of the extractable frames; and
   a signal-processing unit disposed on the sustaining board in a corridor between two rows of the extractable frames;
   wherein at least one extractable unit is respectively inserted in the extractable frames and coupled to the signal-processing unit,
   wherein the extractable frame is bent to form a covering board having a plurality of punched holes and two lateral plates each provided with a guiding track, and
   wherein the bottom edge of each lateral plate is further bent to form a coupling portion fixedly joined to the sustaining board by a plurality of fixing elements.

2. The housing assembly for an extractable redundant array of independent disks according to claim 1, wherein each of two lateral ends of the sustaining board is bent into a wall plate with a plurality of through holes for aiding positioning of the extractable units.

3. The housing assembly for an extractable redundant array of independent disks according to claim 1, wherein the extractable unit is a hard disk drive.

4. The housing assembly for an extractable redundant array of independent disks according to claim 1, wherein a plurality of heat-dissipating holes is perforated in the cover board or the lateral plates.

5. The housing assembly for an extractable redundant array of independent disks according to claim 1, wherein the signal-processing unit is coupled to an extractable redundant array of independent disks controller.

6. The housing assembly for an extractable redundant array of independent disks according to claim 1, wherein a plurality of cooling fans is anchored at the panel by a plurality of set bolts; and a plurality of heat-dissipating holes extend through the panel at positions corresponding to the cooling fan.

7. The housing assembly for an extractable redundant array of independent disks according to claim 1, wherein the force-applying portion of the panel is a pair of handgrips.

8. A housing assembly for an extractable redundant array of independent disks, comprising:

a main frame disposed in a casing though an open end of the casing, said main frame further comprising a sustaining board and a panel provided with a force-applying portion arranged to enable extraction of the main frame from the casing;

a plurality of spaced extractable frames located on two lateral portions of the sustaining board in a corridor between two rows of the extractable frames; and a signal-processing unit disposed on the sustaining board in a corridor between two rows of the extractable frames;

wherein at least one extractable unit is respectively inserted in the extractable frames and coupled to the signal-processing unit, and wherein the signal-processing unit comprises a stationary deck housed on the sustaining board by a plurality of segregating feet and a plurality of first circuit boards disposed on two sides of the stationary deck and provided with a plurality of slots arranged at positions corresponding to that of each extractable unit respectively.

9. A housing assembly for an extractable redundant array of independent disks, comprising:

a main frame disposed in a casing though an open end of the casing, said main frame further comprising a sustaining board and a panel provided with a force-applying portion arranged to enable extraction of the main frame from the casing;

a plurality of spaced extractable frames located on two lateral portions of the sustaining board in a corridor between two rows of the extractable frames; and a signal-processing unit disposed on the sustaining board in a corridor between two rows of the extractable frames;

wherein at least one extractable unit is respectively inserted in the extractable frames and coupled to the signal-processing unit, and wherein the signal-processing unit comprises a main circuit board fixedly disposed on the sustaining board by a plurality of segregating feet and a plurality of sub-circuit boards residing laterally on the main circuit board, said signal-processing unit being provided with a respective slot individually positioned for each of the extractable units.

10. The housing assembly for an extractable redundant array of independent disks according to claim 9, wherein the sub-circuit board is bent at a turning point to form a relay slot.

\* \* \* \* \*